April 28, 1959

J. R. HUTCHISON 2,884,098

FASTENER SEALING DEVICE

Filed July 1, 1952

INVENTOR.
J.R. HUTCHISON

BY George E. Pearson

ATTORNEY

United States Patent Office 2,884,098
Patented Apr. 28, 1959

2,884,098

FASTENER SEALING DEVICE

James R. Hutchison, Palm City, Calif., assignor to Rohr Aircraft Corporation, Chula Vista, Calif., a corporation of California Application July 1, 1952, Serial No. 296,679

2 Claims. (Cl. 189—36)

This invention relates to sealing devices, particularly to such sealing devices as are used to seal the rivets, bolts, screws or similar fasteners against the passage of liquids or gases when such fasteners are employed in the construction of tanks, pressure vessels or other liquid or air tight structures.

The primary object of the invention is to provide an effective means for hermetically sealing the fasteners used in the construction of tanks, pressure vessels and the like which will not impair or diminish the mechanical strength of the fastener when installed in the structure.

Another object is to provide a sealing device which will maintain its effective sealing qualities through a wide range of pressure and temperature changes.

A further object is to provide a sealing device which may be readily installed with all types of conventional fasteners and which will provide an effective seal for long periods of service.

Another object is to provide a sealing device which is simple and inexpensive to manufacture and easily assembled on a fastener.

A further object is to provide a sealing means which may be assembled on the fastener before the assembly of fastener and sealing means is inserted in the members to be secured together.

These and other objects will become apparent as the description of the device proceeds.

The satisfactory sealing of the fasteners used in the assembly of aircraft fuel tanks, pressurized cabins and the like, has become increasingly important and difficult with the development of aircraft which are capable of attaining extremely high speeds and very high altitudes. The severe stresses to which the airplane structure is subjected by these high speeds makes it important that the fasteners used in its construction maintain a high degree of mechanical strength. It is therefore important that the sealing devices used with these fasteners do not impair their mechanical strength and unduly weaken the structure. Laboratory tests have shown that my new sealing device substantially increases the shear values of the riveted joints in which they are installed providing a mechanically stronger structure and at the same time effectively sealing the rivets against leakage of liquids or gases.

Also the sealing devices commonly in use at the present time are designed primarily for installation under the head of the fastener making them difficult to use with a fastener whose head is required to be flush with the surface of the structure. My sealing device may be installed adjacent the head of the fastener without affecting its strength or sealing efficiency, an important advantage in modern aircraft construction.

Due to the high altitudes at which modern airplanes operate, the sealing devices used to seal the fasteners are subjected to a wide range of temperatures and pressures. By the use of a resilient gasket compressed around the shank of the fastener and entirely enclosed within a rigid metal structure which protects the resilient seal as well as retaining it in a compressed state of sealing contact, the sealing properties of my device remain unaffected by changes in pressure or temperature. Also, by completely enclosing the gasket within a metal structure it is not subjected to the deleterious effects of changeable atmospheric conditions thereby greatly prolonging its service life.

Another feature of my invention is the ease with which it may be installed. No special tools are required in its installation and when used under the heads of the fasteners it is possible to assemble sealing devices on a number of the fasteners prior to their installation and insert them with the fastener in the members to be secured together, thus greatly reducing the time usually required to install sealing devices of this type.

My invention consists primarily of a resilient rubber-like toroidal gasket which is positioned around the shank of a fastener extending through a countersunk opening in one of the overlapping walls of a tank or similar structure. The head of the fastener having the shape of a truncated cone the peripheral wall of which is adapted to engage the wall of the countersunk opening and which has a central opening through which the shank of the fastener passes, is inserted into the countersunk opening over the gasket. When the fastener is tightened, the peripheral wall of the head is drawn into engagement with the wall of the countersunk opening and the gasket is compressed into sealing contact with the shank of the fastener and the surrounding adjacent parts of the structure, effectively sealing the joint against passage of liquids or gases.

For a better understanding of the invention reference is made to the accompanying drawing illustrating a preferred embodiment thereof in which similar numerals of designation refer to similar parts throughout the several views and in which.

Figure 1:
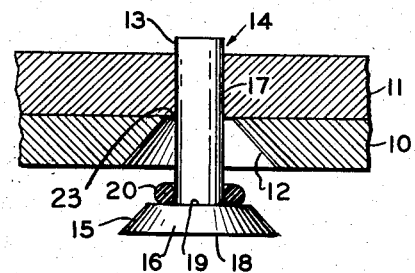
Figure 1 is a view in cross section of the sealing device in position on the shank of a rivet extending through the countersunk opening in the overlapping walls of a tank, prior to the securing of the rivet.
Figure 2:
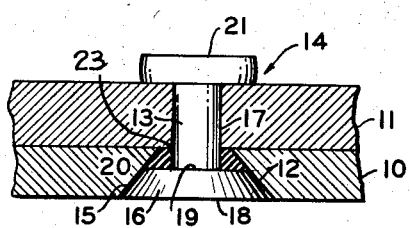
Figure 2 is a cross sectional view similar to Figure 1 in which the rivet has been secured, drawing the rigid rivet head into engagement with the wall of the countersunk opening and compressing the resilient gasket into sealing contact with the shank of the fastener and the adjacent parts of the structure.

Referring to Figures 1 and 2, the invention is shown in connection with a tank wall composed of an outer metal sheet 10 and an overlapping inner sheet 11 joined together by a fastener. Sheet 10 is provided with a countersunk opening 12 through which the shank 13 of a rivet generally designated 14 passes to receive the tapered peripheral wall 15 of the preformed frusto-conical head 16 of the rivet, the conical marginal wall 12 having the same taper as the peripheral wall 15 of the frusto-conical head 16. Sheet 11 is provided with a cylindrical opening 17 extending therethrough which is concentric with opening 12 and through which shank 13 extends. The outer end 18 of head 16 becomes flush with the outer surface of sheet 10 when the head is seated in the marginal wall 12, as shown in Figure 2, the inner or small end 19 being spaced from the inner surface thereof. A toroidal gasket 20, preferably of cylindrical cross section, composed of resilient rubber-like material having an opening through which shank 13 may freely pass, is positioned within opening 12 around shank 13 and on small end 19 of head 16. Gasket 20 may be made of natural or synthetic rubber, "neoprene" or any suitable resilient material which is insoluble in the fluid to be contained in the tank.

Rivet head 16 is preferably made of metal which is harder than that used in the wall in which the retainer is seated. Upon driving the head 21 of the rivet, the head 16 is drawn into opening 12 and sheets 10 and 11 drawn and riveted together. Simultaneously gasket 20 is deformed and compressed into sealing contact and engagement with the flat inner end 19 of head 16, shank 13 and the marginal wall 12 of the countersunk opening in outer sheet 10, completely filling the space above end 19 as shown in Figure 2, thus sealing the riveted joint. When a small area portion 23 of the flat inner surface of sheet 11 surrounding opening 17 is exposed by reason of opening 12 being slightly larger in diameter at its small end than the diameter of opening 17, gasket 20 is also compressed into sealing contact therewith. As may be observed, the resilient gasket is entirely contained within the structure in a position so that, in its compressed state, it effectively seals the joint against any leakage of the contents of the tank along the fastener or along the abutting faces of sheets 10 and 11. Also to be noted is the rigid installation of the rivet obtained through the use of the tapered head 16 seated in the countersunk opening 12 which provides a full metal to metal connection between sheets 10 and 11 and rivet 14, the pressure of the tightened rivet being transmitted to sheet 11 by rivet head 21. As may be seen, the fastener installed with my sealing device is as permanently rigid as one installed in a conventional manner without any sealing device. It will also be noted that any shear load applied to sheet 11 due to the flexing of a tank mounted on an airplane is transmitted by head 21 directly to the shank 13 of the rivet.

If a number of rivets of this type are to be driven, a gasket may be put on the shank of each rivet before any of the rivets are driven, thus saving the time of the rivet driver and speeding up the riveting operation.

Figure 3:
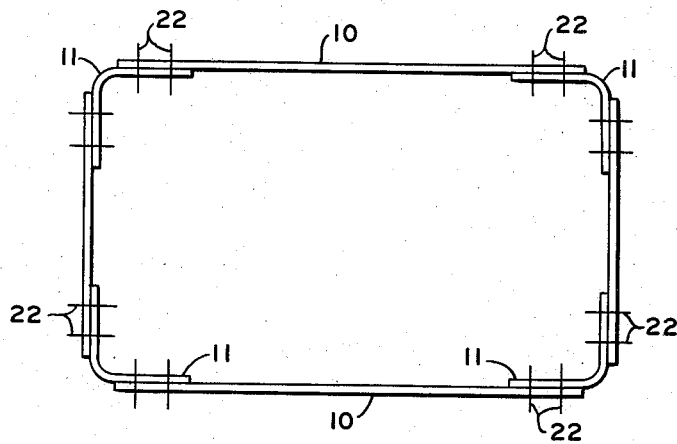
Figure 3 is a view in vertical cross section and partly diagrammatic of a tank, illustrating the manner in which the various sheets composing the structure are joined together by rows of riveted joints.

In Figure 3 of the drawing is illustrated the construction of a tank the walls of which are composed of the overlapping sheets 10 and 11 joined together by a riveted joint formed by two rows of spaced apart fasteners, each row represented by a line 22. The fasteners used may be of the sealed types illustrated in Figures 1 and 2.

In manufacturing the sealing device it is preferable that the opening in gasket 20 be sufficiently large to permit the shank of the fastener to just pass through it freely to facilitate the passage of the gasket along the shank and to avoid damage to the gasket when it is compressed into sealing contact with the surrounding members.

To install the sealing device, I prefer to drill an opening through both sheets 10 and 11 of the size required to pass shank 13 of the fastener. I then countersink this opening through wall 10 to the same degree of taper as the taper of the peripheral wall 15 of rivet head 16, thus forming countersunk opening 12 in which head 16 is to be seated. To ensure that opening 12 is concentric with cylindrical opening 17, I use a countersink having a pilot of the same diameter as shank 13, the pilot remaining in opening 12 during the countersinking operation.

As may be seen, the manufacture and installation of my sealing device is inexpensive and simple and it provides an effective means for hermetically sealing fasteners without impairment of their mechanical strength, making its use particularly advantageous in the construction of aircraft in which a great many sealing devices are used.

This invention may be embodied in other forms or carried out in other ways without departing from the spirit or essential characteristics thereof. The present embodiment of the invention is therefore to be considered in all respects as illustrative and not restrictive, the scope of the invention being indicated by the appended claims, and all changes coming within the meaning and range of equivalency of the claims are intended to be embraced therein.

Having thus described my invention, what I claim as new and useful and desire to secure by Letters Patent is:

1. A laminated structure comprising a metallic rivet having a cylindrical shank terminating at its lower end in a preformed frusto-conical head; a toroidal gasket of resilient material disposed around said shank and in contact with the small end of said head; at least two overlapping sheets of rigid material, said sheets having a vertical opening through which said rivet passes, the upper portion of said opening being cylindrical and the lower portion thereof having a conical marginal wall having the same taper as said rivet head and in contact with said head; a driven head at the upper end of said shank, said sheets being compressed together and said gasket being deformed into sealing contact with said conical marginal wall, the shank and the inner end of said frusto-conical head upon the driving of said head.

2. Means for sealing the riveted joint between inner and outer metal sheets, the inner sheet having a cylindrical hole therethrough and the outer sheet having a hole therethrough in alignment with said cylindrical hole, the hole in the outer sheet having a marginal wall which tapers uniformly outwardly and terminates in the outer face of the outer sheet; a rivet having a cylindrical shank extending through said cylindrical hole and terminating in a preformed head having the shape of a conical frustum tapered to correspond with said tapered marginal wall; and a rubber-like toroidal ring disposed against said shank and the inner end of said rivet head, the other end of said shank being upset to form a second rivet head, the inner sheet being pressed into firm contact with the outer sheet and said ring being deformed into sealing contact with the inner end of said preformed head, said tapered marginal wall and the shank of said rivet upon the forming of said second rivet head.

References Cited in the file of this patent

UNITED STATES PATENTS

| | | |
|---|---|---|
| 1,937,086 | Kaplan | Nov. 28, 1933 |
| 2,016,223 | Bowers | Oct. 1, 1935 |
| 2,250,343 | Zigler | July 22, 1941 |
| 2,396,005 | Gross et al. | Mar. 5, 1946 |
| 2,517,012 | Miller | Aug. 1, 1950 |
| 2,566,777 | Schmidt | Sept. 4, 1951 |
| 2,611,285 | Gross | Sept. 23, 1952 |
| 2,635,785 | Gross | Apr. 21, 1953 |